United States Patent [19]
Sommer et al.

[11] Patent Number: 5,455,101
[45] Date of Patent: Oct. 3, 1995

[54] FLAT SEALING PLATE COMBUSTION ENGINE GASKET

[75] Inventors: Horst Sommer, Wilhelm-Hachtel-Strasse 1, D-7022 Musberg; Thomas Anhorn, Dettingen; Wilhelm Kullen, Hülben, all of Germany

[73] Assignee: Horst Sommer, Musberg, Germany

[21] Appl. No.: 356,774

[22] Filed: Dec. 12, 1994

Related U.S. Application Data

[63] Continuation of Ser. No. 102,857, Aug. 6, 1993, abandoned, which is a continuation of Ser. No. 634,492, Dec. 27, 1990, abandoned.

[30] Foreign Application Priority Data

Dec. 29, 1986 [DE] Germany ............... 39 43 292.0

[51] Int. Cl.⁶ ............... B65D 53/00; C25D 7/04; B32B 3/10; B32B 15/04
[52] U.S. Cl. ............... 428/137; 277/234; 277/235 B; 428/131; 428/457; 428/469; 428/606; 428/607
[58] Field of Search ............... 277/235 B, 234; 428/606, 607, 596, 625, 131, 137, 457

[56] References Cited

U.S. PATENT DOCUMENTS

| | | | |
|---|---|---|---|
| 1,823,284 | 9/1931 | Oven | 277/234 |
| 2,711,334 | 6/1955 | Balfe | 277/234 |
| 3,567,234 | 3/1971 | Skrycki | 277/235 B |
| 4,466,617 | 8/1984 | Montgomery | 277/234 |
| 4,477,513 | 10/1984 | Koga | 428/294 |
| 4,478,887 | 10/1984 | Sommer et al. | 427/211 |
| 4,489,123 | 12/1984 | Sohijve et al. | 428/294 |
| 4,520,068 | 5/1985 | Sommer et al. | 428/331 |

FOREIGN PATENT DOCUMENTS

| | | |
|---|---|---|
| 0013146 | 9/1980 | European Pat. Off. . |
| 0635823 | 4/1950 | United Kingdom . |

*Primary Examiner*—James D. Withers
*Attorney, Agent, or Firm*—Harness, Dickey & Pierce

[57] ABSTRACT

A flat sealing plate for combustion engines and a method for manufacturing same are disclosed. The sealing plate comprises a layer of soft sealing material consisting of mineral base compounds as well as of a binder material being at least partially vulcanized. A first and a second metallic foil are glued on both sides of the soft sealing material layer. For the manufacture of such sealing plate calender rolls are used to calender the sealing material on the first foil and additional rollers are then used to laminate the second foil on the opposite side of the sealing material layer.

10 Claims, 2 Drawing Sheets

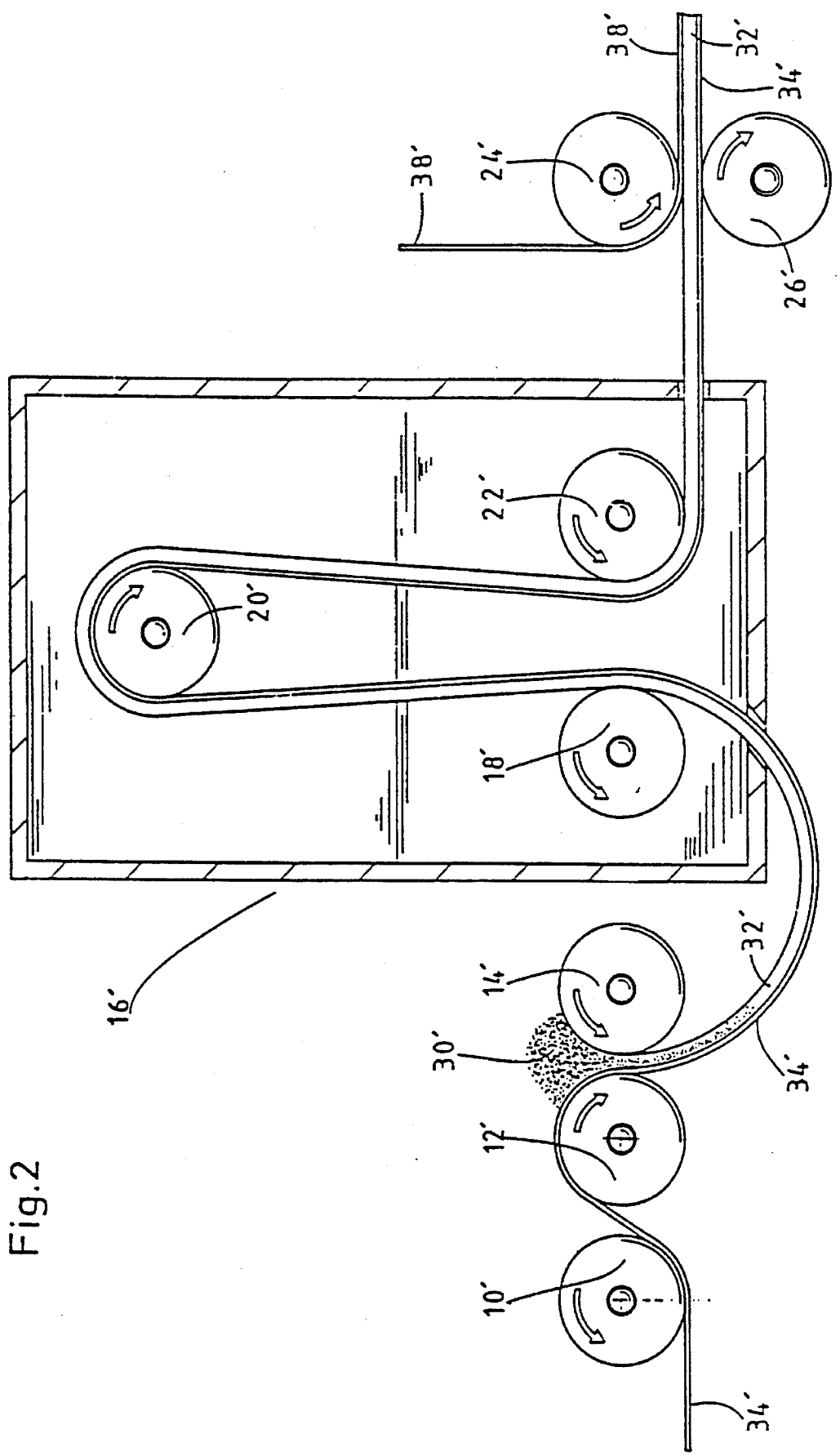

FLAT SEALING PLATE COMBUSTION ENGINE GASKET

This is a continuation of U.S. patent application Ser. No. 08/102,857, filed Aug. 6, 1993, now abandoned, which is a continuation of U.S. patent application Ser. No. 07/634,492, filed Dec. 27, 1990, now abandoned.

This invention relates to a flat sealing plate for combustion engines and, more specifically, to a plate having a soft sealing layer, the soft sealing layer consisting essentially of mineral base materials and a binder being at least partially vulcanized. Still more specifically, the invention relates to a sealing plate of the afore-mentioned kind as used for making cylinder head gaskets or gaskets for exhaust pipe bends or gaskets for combustion engine intake devices, gaskets for an oil pan or for a cylinder head cover or gaskets for a water pump or an oil pump or for other servo systems for the brakes or the steering of a motor vehicle.

In the following description, the invention shall be described with respect to the example of a flat sealing plate as used for cylinder head gaskets. Insofar, the prior art is the following:

The most popular sealing plates are designed such that they comprise a carrier sheet metal being covered on both surfaces with a soft sealing material layer. The carrier metal sheet and the soft sealing material layers are attached to each other by way of glueing and/or by mechanical means consisting essentially of indentations being punched into the carrier metallic sheet and bent from the surface of the latter. The bent-off indentations, therefore, penetrate into the soft sealing material layer during calendering of the soft sealing material onto the carrier metallic sheet. The soft sealing material essentially consists of a compound of e.g. mineral base materials, fibers as asbestos fibers or organic fibers as well as a vulcanizable binder which is vulcanized after the calendering of the soft sealing material layer onto the carrier metal sheet.

However, it has to be borne in mind that the soft sealing material is exposed to cooling water of combustion engines, the cooling water containing anti-freeze substances. Further, the soft sealing material is exposed to motor oil and to exhaust gases. Therefore, in the design of combustion engines for trucks but also in the design of high-power combustion engines for passenger cars, one has used sealing plates consisting of one or more sheet metal layers. However, the range of possible adaptation of such sealing plates to the motor block surface and to the cylinder head surface, which have to be sealed with respect to each other, is limited.

It is, therefore, an object of this invention to provide a sealing plate of the above-mentioned kind which has no specifically high requirements with respect to the quality of the soft sealing materials used but is, nevertheless, highly resistant and can, therefore, also be used e.g. as a cylinder head gasket of a combustion engine.

According to the invention, a flat sealing plate for combustion engines is provided, comprising a layer of soft sealing material, said material consisting of mineral base compounds as well as of a binder material being at least partially vulcanized, said layer having an upper surface and a lower surface; the sealing plate further comprising a first metallic foil glued onto said layer on said upper surface as well as a second metallic foil glued onto said layer on said lower surface.

Moreover, according to the invention, a method of manufacturing flat sealing plates for combustion engines is provided, comprising the steps of:

providing a first elongate metal foil having a first and a second surface with a first adhesive layer on said first surface;

feeding said first foil to a first pair of calender rollers, a first of said pair of rollers rotating faster than a second of said pair of rollers, rotating slower, said first foil contacting said faster rotating roller with a second surface, opposite said first surface, said first surface with said first adhesive layer thereon facing said slower rotating roller with a predetermined distance thereto;

feeding a soft sealing material between said slower rotating roller and said first adhesive layer to calender a sealing material layer on said first foil;

providing a second elongate metal foil having a third and a fourth surface with a second adhesive layer on said third surface;

downstream said first layer of calender rollers feeding said first foil with said first adhesive layer and said sealing material layer thereon between another pair of rollers consisting of a third and a fourth roller, said first foil contacting said third roller with said second surface, said first surface with said first adhesive layer and said sealing material layer thereon facing said fourth roller with a predetermined distance thereto;

feeding said second foil with said second adhesive layer thereon between said fourth roller and said sealing material layer, said second foil contacting said fourth roller with said fourth surface to laminate said second foil on said sealing material layer;

linearly discharging said sealing material layer with said first and said second foil thereon from said other pair of rollers; and cutting said linear sealing material layer with said first and said second foil thereon into plates of predetermined width.

The sealing plate according to the invention has a number of distinct advantages:

First, the soft sealing material layer in its main surface is not exposed to media which are to be sealed against each other. Second, inspite thereof, the sealing plate according to the invention may well be adapted to surfaces which are to be brought into sealing relationship with each other. Moreover, the sealing plate according to the invention is extremely resistant against shoving motions of the machine parts which are to be sealed with respect to each other, and, therefore, against shearing stress exerted on the soft sealing material. In case of a cylinder head gasket, the sealing plate according to the invention effects a good heat dissipation away from the surrounding of the combustion chamber.

Considering that the sealing plate according to the invention does not impose such strict requirements on the soft sealing material, as compared with sealing plates having a main surface made from the soft sealing material, the sealing plate according to the invention allows to use soft sealing materials of lower quality and, hence, lower price for manufacturing sealing plates according to this invention. In particular, the sealing plate according to the invention allows to use sealing materials not containing asbestos fibers. In some instances it is even possible to use soft sealing materials containing no fibers at all.

If it is intended that the sealing plate according to the invention shall adapt itself to the surfaces which are to be brought into sealing relationship with each other, one must obviously use metal foils on the main surfaces of the plate which are not too thick, i.e. the metal foil thickness is depending on the required plate deformability.

In the art of cylinder head gaskets it is a requirement that such cylinder head gaskets must be detachable without any sealing plate material sticking to the motor block or to the cylinder head. Therefore, prior art cylinder head gaskets had been provided with special surface coatings in order to prevent sticking of soft sealing material to the surfaces of the motor block and the cylinder head which had to be brought into sealing relationship with each other. It goes without saying that such additional measures during the manufacture of a cylinder head gasket are time- and cost-consuming. Such measures, however, are not required during the manufacture of a sealing plate according to this invention because there is no soft sealing material on the main surface of the sealing plate.

Another important advantage with the sealing plate of this invention is that the laminate structure of the sealing plate is particularly advantageous in those cases where the sealing plate surface is exposed to the media which are to be sealed. For example, considering the case of a cylinder head gasket, it is customary to use a larger bore diameter in the motor block and a smaller diameter in the cylinder head gasket in order to control the circulation of cooling water. In such cases the sealing plate, having a smaller hole as compared with the diameter of the cooling water bore, is partially totally immersed into the circulating cooling water and acts as a throttle.

Moreover, according to the invention, a gasket in an exhaust gas bend may be designed to extend over the periphery of the bend in order to act as a heat shield for protecting other devices like ignition cables from being heated up to inadmissible temperatures.

As mentioned before, the soft sealing material layer of a sealing plate according to the invention may be entirely free of fibers or contain only a relatively small amount of organic fibers because even if such sealing plate is used as a cylinder head gasket, the stress exerted on the soft sealing material layer is entirely different as compared with the case of conventional sealing plates having a central carrier sheet metal with two soft sealing material layers applied on both surfaces thereof. It should be mentioned at this instance that U.S. Pat. No. 4,478,887 discloses a method of manufacturing plates for making flat gaskets or heat-isolating plates, which plates contain a soft material consisting essentially of mineral base materials and a binder being at least partially vulcanizable as well as of a minor portion of organic fibers. According to this prior art, the soft material comprises at least 80% powder-like mineral base materials, approx. 6% of a vulcanizable binder and, moreover, organic fibers, the fiber content of which is preferably between about 3% and 14%. Such composition of soft materials is also preferred in connection with the plate according to this invention.

For making plate material according to this prior art, the method is as follows:

A web of carrier sheet metal is first provided on one surface thereof with an adhesive layer. Then, the web of carrier sheet metal runs into a first pair of calender rollers with which a powder-like soft sealing material is applied on the first sheet metal web surface to make a first soft material layer thereon. Then, the carrier sheet metal web runs through a furnace whereafter its second surface is provided with an adhesive layer. Then, the carrier sheet metal web, being provided with a soft material layer on one surface thereof, runs through a second pair of calender rollers with which a powder-like soft sealing material is applied to the second surface of the carrier sheet metal web to create a second soft sealing material layer thereon. The carrier sheet metal web, being now provided with soft sealing material layers on both surfaces, then runs to another surface and is then rolled onto a coil.

Now, this prior art method shall be improved according to this invention to provide plate material according to this invention which guarantees an improved adhesion of the soft sealing material on the respective metal foil.

Moreover, considering that according to the method of this invention, the laminate is not rolled onto a coil but is rather cut into plates of predetermined widths when it is still in elongate configuration, shoving and sheering of the different layers of the laminate structure relative to each other and, therefore, separation of the soft sealing material layer from the metal foils are entirely prevented.

According to a preferred embodiment of the inventive method, a second pair of calender rollers is arranged upstream the first pair of calender rollers, the rollers of which are driven with different peripheral speeds. Powder-like soft sealing material is fed into an input gap between the upstream pair of calender rollers in order to create on the faster running roller a soft sealing material layer. If it is intended to save one roller, another embodiment of the invention is preferred, according to which the faster running roller of the upstream pair of calender rollers is identical with the slower roller of the first pair of calender rollers with which the first web of metal foil is provided with the soft sealing material layer.

In particular, when the binder of the soft sealing material layer is vulcanized in a furnace, having a deflection roller for the laminate consisting of the first metal foil web and of the soft sealing material layer, it is advisable to apply the second metal foil on the soft sealing material layer only after the vulcanization of the binder in order to avoid movements of the two metal foils relative to each other and, hence, to avoid separation of the metal foils from the soft sealing material layer. In any case, one has to avoid that the laminate web is deflected after the soft sealing material layer binder is vulcanized.

According to a preferred embodiment of the the plate according to the invention, as used for cylinder head gaskets, the metal foils have a maximum thickness of about 0.2 mm. Moreover, the maximum thickness of the entire plate is about 2 mm. The soft sealing material density may be between about 1.5 and 2 $g/cm^3$ and may, preferably, be at least about 1.7 $g/cm^3$. Moreover, it is preferred to use a soft sealing material layer being about 1.6 mm thick.

It is preferred to use nitrile rubber as soft sealing material binder. Moreover, it is preferred to use a nitrile butadiene rubber phenolic resin adhesive as adhesive for glueing the metal foils onto the soft sealing material layer.

It is recommended to use those mineral base materials for the soft sealing material as described in U.S. Pat. No. 4,478,887, the disclosure of which is incorporated herein by way of reference.

The above and other objects of the invention will be apparent from the following description and the appended claims.

Embodiments of the invention are shown by way of example in the accompanying drawings, in which:

FIG. 2 is a sectional view, similar to that of FIG. 1, for another embodiment of the invention.

Figure 1:
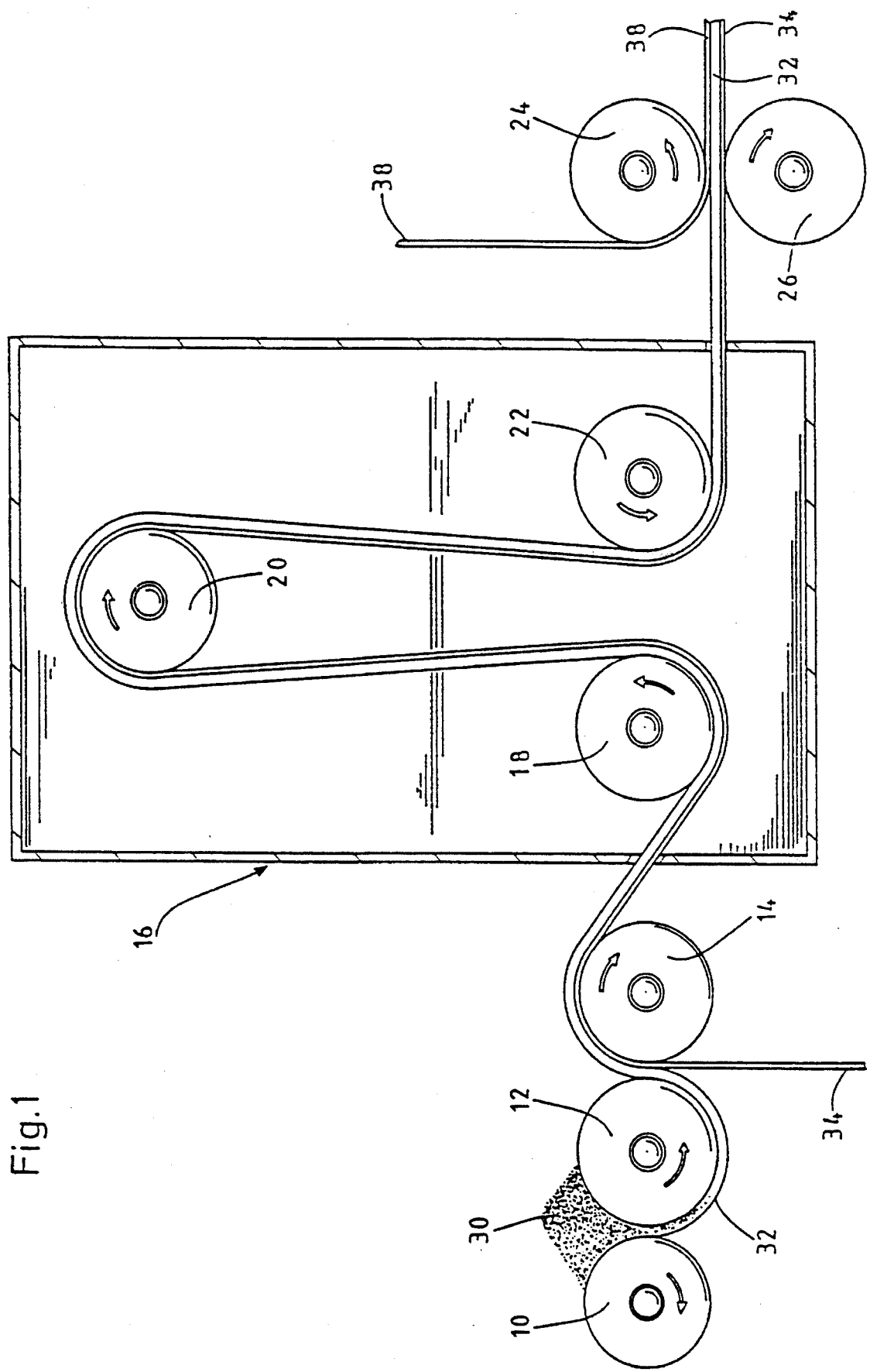
FIG. 1 is a schematic cross-section through an installation for the manufacture of flat sealing plates.

The installation of FIG. 1 comprises three calender rollers 10, 12 and 14. The first calender roller 10 is driven with the lowest peripheral speed, second calender roller 12 is driven with intermediate peripheral speed and third calender roller 14 is driven with maximum peripheral speed. As compared with the appended claims, calender rollers 12 and 14 constitute a first pair of calender rollers whereas rollers 10 and 12 constitute a second pair of calender rollers. Downstream the installation, a furnace 16 is provided comprising three deflection rollers 18, 20 and 22. Downstream the furnace is another pair of rollers consisting of rollers 24 and 26 being driven in opposite revolutional directions with the same peripheral speed. Rollers 14, 18, 20, 22, 24 and 26 have the same peripheral speed. The rotational direction of the aforementioned rollers is indicated in the drawings by way of arrows.

The pair of calender rollers 10, 12 is provided with an intake gap being fed with a powder-like soft sealing material 30. Because of the higher peripheral speed of roller 12 a soft sealing material layer 32 is created thereon. A first web 34 of smooth metal foil has a left side in FIG. 1 being provided with an appropriate adhesive. Web 34 runs into a gap of calender roller pair 12, 14 simultaneously with soft sealing material layer 32. Because of the higher peripheral speed of roller 14, as compared with roller 12, the soft sealing material layer 32 is transfered on the first web 34 of metal foil. A binder being comprised in the soft sealing material is partially vulcanized in furnace 16 for fixedly attaching soft sealing material layer 32 to web 34 of metal foil.

Finally, the laminate consisting of first web 34 of metal foil and soft sealing material 32 runs through rollers 24 and 26. A second web 38 of a smooth metal foil has a left side in FIG. 1 being provided with an appropriate adhesive layer. Second web 38 of soft metal foil runs between rollers 24 and 26 simultaneously with laminate such that second web 38 is fixedly attached onto soft sealing material layer 32.

Finally, laminate web 34, 32, 38 is cut into appropriate plates without being rolled on a coil.

Considering now an installation according to FIG. 2, corresponding parts as already having appeared in FIG. 1 are provided with the same reference numerals, however, an apostrophe is added.

The installation of FIG. 2 uses two first rollers 10' and 12' having the same peripheral speeds but opposed rotational directions. Therefore, a first web of metal foil 34' may be fed therethrough and may be advanced by means of rollers 10' and 12'. The left side of the metal foil web 34', as seen in its advancing direction, is provided with an appropriate adhesive layer. The intake gap of roller pair 12', 14' is provided with powder-like soft sealing material 30'. Considering that roller 14' is driven with lower peripheral speed, as compared with roller 12', the soft sealing material layer 32, having been generated between rollers 12' and 14' will stick to web 34' of metal foil running through the roller gap with the peripheral speed of faster rotating roller 12'.

Then, laminate 32', 34' runs through a furnace 16', having, again, three deflection rollers 18', 20' and 22'. Laminate 32', 34' is guided thereover such that it will be forcedly advanced by means of driven rollers 18', 20', 22' such that laminate 32', 34' is tension-free between rollers 14' and 18'. This is of particular advantage because the situation prevailing with an installation according to FIG. 1 is avoided where shear stress is generated on roller 14 between the generated soft sealing material layer 32 and metal foil web 34 because roller 14 is driven at higher peripheral speed as compared with roller 12. Such shear stress, however, acts disadvantageously on the adhesion between the soft sealing material layer and the metallic foil web.

The function of roller pair 24', 26' and of second metal foil web 38' again, corresponds to that of the corresponding parts of the installation according to FIG. 1.

I claim:

1. A combustion engine gasket in the form of a flat sealing plate for providing a compressive seal between mating surfaces of a combustion engine having at least one opening formed through the interface of the mating surfaces, said gasket consisting of:

a layer of soft sealing material comprising mineral base compounds as well as a binder material being at least partially vulcanized, said layer having an upper surface and a lower surface;

a first metallic foil glued onto said layer on said upper surface or contacting one of said main surfaces of the combustion engine; and a second metallic foil glued onto said layer on said lower surface for contacting the other of said mating surfaces of the combustion engine;

wherein the planar configurations of said soft sealing material and said first and second metallic foils are all identical and include an aperture formed entirely therethrough that substantially conforms to the opening in the mating surfaces of the combustion engine.

2. The sealing plate gasket of claim 1 wherein said layer comprises fibers, said fibers being of aramide organic material.

3. The sealing plate gasket of claim 1 wherein said first and said second foil are designed as smooth foils.

4. The sealing plate gasket of claim 1 wherein each of said first and said second foils have a maximum thickness of 0.2 mm.

5. The sealing plate gasket of claim 1 wherein said layer has a thickness of approximately 1.6 mm.

6. The sealing plate gasket of claim 1 wherein said layer has a density of from 1.5–2.0 g/cm$^3$.

7. The sealing plate gasket of claim 1 wherein said plate gasket has a maximum total thickness of 2 mm.

8. The sealing plate gasket of claim 6 wherein said layer has a density of between 1.7 and 2.0 g/cm$^3$.

9. A combustion engine gasket for providing a compressive seal between mating surfaces of a combustion engine having at least one opening formed through the interface of the mating surfaces, said gasket consisting of:

a layer of soft sealing material said material being free fibers and comprising mineral base compounds as well as binder material being at least partially vulcanized, said layer having an upper surface and a lower surface;

a first metallic foil glued onto said layer on said upper surface for contacting one of said mating surfaces of the combustion engine; and a second metallic foil glued onto said layer on said lower surface for contacting the other of said mating surfaces of the combustion engine;

wherein the planar configurations of said soft sealing material and said first and second metallic foils are all identical and include an aperture formed entirely therethrough that substantially conforms to the opening in the mating surfaces of the combustion engine.

10. A combustion engine gasket for providing a compressive seal between mating surfaces of a combustion engine having at least one opening formed through the interface of the mating surfaces, said gasket consisting of:

a layer of soft sealing material, said material comprising mineral base compounds, a binder material being at least partially vulcanized, and fibers being of an organic material, said layer having an upper surface and a lower surface;

a first metallic foil glued onto said layer on said upper surface for contacting one of said mating surfaces of the combustion engine; and a second metallic foil glued onto said layer on said lower surface for contacting the other of said mating surfaces of the combustion engine;

wherein the planar configurations of said soft sealing material and said first and second metallic foils are all identical and include an aperture formed entirely therethrough that substantially conforms to the opening in the mating surfaces of the combustion engine.

* * * * *

UNITED STATES PATENT AND TRADEMARK OFFICE
CERTIFICATE OF CORRECTION

PATENT NO.   :   5,455,101
DATED        :   October 3, 1995
INVENTOR(S)  :   Horst Sommer et al.

It is certified that error appears in the above-indentified patent and that said Letters Patent is hereby corrected as shown below:

Column 6, line 9, claim 1, "or" should be --for--.

Column 6, line 9, claim 1, "main" should be --mating--.

Signed and Sealed this

Twenty-third Day of April, 1996

Attest:

BRUCE LEHMAN

*Attesting Officer*     Commissioner of Patents and Trademarks